United States Patent
Imada

(10) Patent No.: US 9,302,942 B2
(45) Date of Patent: Apr. 5, 2016

(54) ALUMINA SINTERED BODY AND SPARK PLUG

(71) Applicant: DENSO CORPORATION, Kariya, Aichi-pref. (JP)

(72) Inventor: Shota Imada, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/807,134

(22) Filed: Jul. 23, 2015

(65) Prior Publication Data

US 2016/0023953 A1   Jan. 28, 2016

(30) Foreign Application Priority Data

Jul. 24, 2014 (JP) .................................. 2014-150827

(51) Int. Cl.
*H01T 13/02* (2006.01)
*C04B 35/10* (2006.01)
*H01T 13/08* (2006.01)

(52) U.S. Cl.
CPC ................ *C04B 35/10* (2013.01); *H01T 13/08* (2013.01)

(58) Field of Classification Search
CPC .............................. H01T 13/38; C04B 35/10
USPC .................................................. 313/130, 118
See application file for complete search history.

(56) References Cited

U.S. PATENT DOCUMENTS

| | | |
|---|---|---|
| 2007/0298245 A1 | 12/2007 | Ogata et al. |
| 2008/0309388 A1 | 12/2008 | Hashimoto et al. |
| 2010/0084960 A1 | 4/2010 | Kurono et al. |
| 2010/0136867 A1 | 6/2010 | Kurono et al. |
| 2010/0229813 A1 | 9/2010 | Ogata et al. |
| 2011/0251042 A1 | 10/2011 | Araki et al. |
| 2012/0007489 A1 | 1/2012 | Kurono et al. |

FOREIGN PATENT DOCUMENTS

| | | |
|---|---|---|
| JP | 11-195473 | 7/1999 |
| JP | 2000-247729 | 9/2000 |
| JP | 2001-002466 | 1/2001 |
| JP | 2001-313148 | 11/2001 |
| JP | 2001-335360 | 12/2001 |
| JP | 2008-024583 | 2/2008 |
| JP | 2010-208901 | 9/2010 |
| JP | 4607253 | 10/2010 |
| JP | 2010-251281 | 11/2010 |
| JP | 2011-219301 | 11/2011 |
| JP | 5111603 | 10/2012 |
| WO | 2009/119097 | 10/2009 |
| WO | WO 2009/119098 | 10/2009 |

*Primary Examiner* — Vip Patel
(74) *Attorney, Agent, or Firm* — Nixon & Vanderhye P.C.

(57) ABSTRACT

An alumina sintered body contains a main phase consisting of alumina crystal, and crystalline phases dispersed in the main phase. The crystalline phases consist of at least one selected from a group consisting of $MgAl_2O_4$, $2MgO \cdot 2Al_2O_3 \cdot 5SiO_2$, $2MgO \cdot SiO_2$ and $MgO \cdot SiO_2$. The average grain size of the crystalline phases is 0.4 μm to 5.3 μm. In an arbitrary area having a size of 100 μm×100 μm in a cross-section of the alumina sintered body, the number of the crystalline phases having grain sizes 1 μm to 5 μm is 8 to 412.

3 Claims, 4 Drawing Sheets

ALUMINA SINTERED BODY AND SPARK PLUG

CROSS-REFERENCE TO RELATED APPLICATION

This application is based on and claims the benefit of priority from earlier Japanese Patent Application No. 2014-150827 filed on Jul. 24, 2014, the description of which is incorporated herein by reference.

BACKGROUND

1. Technical Field

This disclosure relates to an alumina sintered body containing a main phase consisting of alumina and crystalline phases dispersed in the main phase.

2. Related Art

Alumina sintered bodies have excellent heat-resistance and dielectric strength, and accordingly are used in insulators such as for vehicle parts. Recently, spark plugs for vehicles need downsizing, and it is desired that thickness of the insulators is smaller. Also, the spark plugs is desired to use a higher voltage. Accordingly, the alumina sintered bodies for insulators of the spark plugs need higher dielectric strength.

Conventionally, an insulating material containing alumina as a primary constituent has been suggested, with a first additive constituent consisting of Si, Ca, Mg, Ba, B and the like, and a second additive constituent consisting of Sc, Ti, V, Cr, Mn, Fe, Co, Ni, Cu, Zn or the like (Japanese Patent Application Publication No. 2000-247729). In the insulating material, by adding both Mn constituent and Cr constituent, a composite oxide phase having high melting point is formed. This increases dielectric strength of the insulating material.

However, in the conventional insulating material, the crystalline phases are formed at random in the alumina sintered body, and accordingly variation of dielectric strength is likely to occur in the alumina sintered body. As a result, the whole sintered body might be insufficient in dielectric strength.

SUMMARY

For solving the problems, this disclosure has an object to provide an alumina sintered body having high dielectric strength and a spark plug using the alumina sintered body.

A first aspect of this disclosure is an alumina sintered body containing a main phase consisting of alumina crystal, and crystalline phases dispersed in the main phase. The crystalline phases consist of at least one selected from a group consisting of $MgAl_2O_4$ (spinel), $2MgO.2Al_2O_3.5SiO_2$ (cordierite), $2MgO.SiO_2$ (forsterite) and $MgO.SiO_2$ (steatite). The average grain size of the crystalline phases is 0.4 μm to 5.3 μm. Further, in an arbitrary area having a size of 100 μm×100 μm in a cross-section of the alumina sintered body, the number of the crystalline phases having grain sizes 1 μm to 5 μm is 8 to 412.

A second aspect of this disclosure is a spark plug having an insulator made of the alumina sintered body according to the first aspect.

DETAILED DESCRIPTION OF PREFERRED EMBODIMENTS

Figure 1:
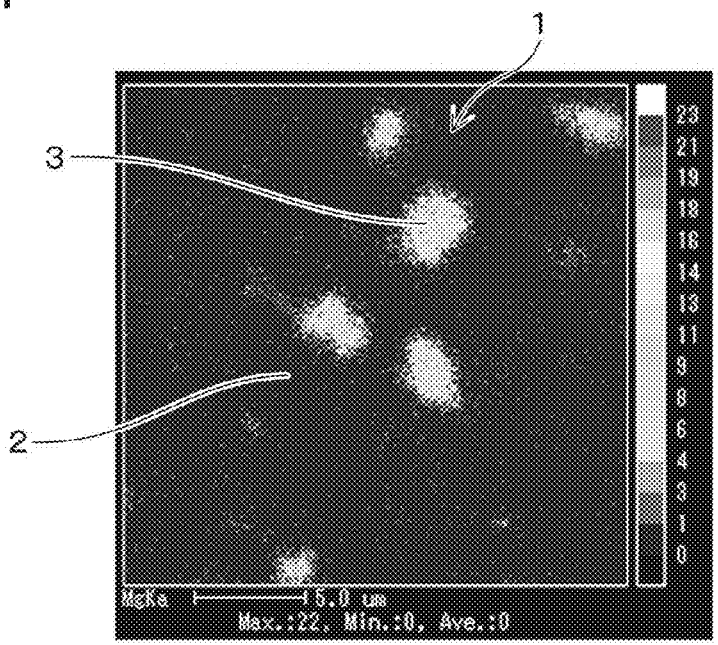
FIG. 1 is an image showing the analysis result of the alumina sintered body by electron probe microanalyser (EPMA) in Example 1.

Now is described a preferred embodiment of an alumina sintered body. It will be noted that "to" indicating number range means the number range includes the boundary number, i.e. inclusive.

In the alumina sintered body, a main phase content is, for example, 95 mass % or more, the main phase consisting of alumina crystal. In the alumina sintered body, the crystalline phase content is, for example, 5 mass % or less. It is preferred that the main phase content is 99 mass % or less, and that the crystalline phase content is 1 mass % or more. The above composition of the main phase and the crystalline phases can increase withstand voltage of the alumina sintered body.

In the alumina sintered body, the crystalline phases are dispersed in the main phase. The crystalline phase may be in a crystal grain of alumina crystal constituting the main phase, or in a grain boundary of the alumina crystal.

For preparing the alumina sintered body, as raw materials, α-alumina, $SiO_2$, MgO, activated alumina ($\gamma$-$Al_2O_3$) and the like may be used. The alumina sintered body can be obtained by performing, for example, a first mixing step, a second mixing step, a granulation step, a compacting step and a sintering step as follows, using these raw materials.

In the first mixing step, of the raw materials, at least two or more selected from $SiO_2$, MgO and $\gamma$-$Al_2O_3$ are mixed in a liquid such as water. In the second mixing step, α-alumina and the rest of the raw materials, which were not mixed in the first mixing step, are added and mixed into the mixture obtained after the first mixing step. The mixing ratio of each raw material at the first mixing step and the second mixing step can be regulated properly, depending on types of compound of the crystalline phase, content of the main phase and the crystalline phases, and the like. In the first and the second mixing steps, a dispersant or a binder may be used as needed. As described above, activated alumina is used in addition to α-alumina in the raw materials, the mixing procedure is divided into at least two steps, and at least two of the additives consisting of $SiO_2$, MgO and $\gamma$-$Al_2O_3$ are mixed before the main ceramic material consisting of α-alumina is mixed in. This can increase reactivity between the additives. As a result, as described above, the average grain size of the crystalline phases in the alumina sintered body can be regulated within the predetermined range, and the number of the crystalline phases having grain sizes of 1 μm to 5 μm can be regulated within the predetermined range. Further, increased reactivity between the additives can make the porosity of the alumina sintered body smaller. The porosity of the alumina sintered body is preferred to be 0.5% or less.

In the granulation step, the slurry mixture obtained after the second mixing step is dried by spray drying. Thus, granulated powders can be obtained.

In the compacting step, a compact is obtained by compacting the granulated powders into a desired shape.

In the sintering step, the compact is sintered. Thereby, the alumina sintered body can be obtained. The sintering temperature is, for example, 1450 to 1650° C.

The alumina sintered body can be used as an electrically insulating material. Especially, application of the alumina sintered body to spark plugs for vehicles can make full use of the excellent dielectric strength of the alumina sintered body. That is, in vehicle engines, recently, it is desired that fuel is ignited under a lean condition, which needs an increase in the voltage applied to the spark plugs. Accordingly, insulators in spark plugs need to have high dielectric strength.

Example 1

In this example, a plurality of alumina sintered bodies (Specimens X1 to X25) different in grain size and dispersion status of the crystalline phases from each other were prepared, and their withstand voltage were compared. The alumina sintered body 1 of each specimen contains the main phase 2 consisting of alumina and the crystalline phases 3 dispersed in the main phase 2 (see FIG. 1). The crystalline phase 3 consists of at least one selected from the group consisting of $MgAl_2O_4$ (spinel), $2MgO \cdot 2Al_2O_3 \cdot 5SiO_2$ (cordierite), $2MgO \cdot SiO_2$ (forsterite) and $MgO \cdot SiO_2$ (steatite). At first, each alumina sintered body of each specimen was prepared, as follows. In this embodiment, there were prepared the alumina sintered bodies having a shape of an insulator for a spark plug of a vehicle described below in Example 3.

Specifically, firstly, powders of α-alumina grains which have purity of 99.9 mass % or more and average grain size of 0.4 to 3.0 μm were prepared. The average grain size of α-alumina means grain size at an integrated volume of 50% in grain size distribution, which is measured by a diffraction/scattering method. As the additives, powders of each compound, $SiO_2$ (silicon oxide), MgO (magnesium oxide) and γ-$Al_2O_3$ (activated alumina), were prepared. The powders of each compound have purity of 97 mass % or more.

Subsequently, water was added into a mixing tank having mixing impellers, and the additives ($SiO_2$, MgO and γ-$Al_2O_3$) were added into the mixing tank. These were mixed by the mixing impellers to disperse the additives into the water. Next, the main ceramic material (α-$Al_2O_3$) and a suitable amount of binder were added into the mixing tank, followed by mixing with the mixing impellers. Thus, a mixture slurry of the main ceramic material and the additives was obtained. Regarding the formulation ratio of the main ceramic material and the additives in the mixture slurry, the main ceramic material was 95 to 99 mass %, and the additives were 1 to 5 mass % in the total mass of the main ceramic material and the additives of 100%. The formulation ratio of each composition ($SiO_2$, MgO, γ-$Al_2O_3$) in the additive can be regulated correctly depending on types of compounds (spinel, cordierite, forsterite, or steatite) of the crystalline phase.

Subsequently, the mixture slurry obtained as above was spray-dried and granulated, thereby obtaining granulated powders. The granulated powders were compacted into the insulator shape to obtain a compact. Next, the compact was sintered to obtain the alumina sintered body having the insulator shape. The sintering temperature was 1450 to 1650° C., and the sintering time was 1 to 3 hours. In this example, 25 types (Specimens X1 to X25) of alumina sintered bodies different in type of the crystalline phases, average grain size and dispersion state (the number of the crystalline phase having grain size of 1 to 5 μm) from each other were obtained as shown in Table 1 below, by changing the formulation ratios of each additive composition.

The average grain size and the number of the crystalline phases in the alumina sintered body of each specimen were measured using an electron probe microanalyser (EPMA). As the EPMA, an EPMA-1610 manufactured by Shimadzu was used. Specifically, an arbitrary cross-section (mirror polished surface) of each specimen was analyzed using the EPMA. The magnification of the EPMA was, for example, 10000. As a typical example, the analysis result of Specimen X6 by the EPMA was shown in FIG. 1. FIG. 1 shows an area having a size of 20 μm×20 μm. As can be seen from FIG. 1, the alumina sintered body 1 according to this example contains the main phase 2 and the crystalline phases 3 dispersed in the main phase 2. The crystalline phases 3 of Specimen X6 consisted of $MgAl_2O_4$ (spinel). In FIG. 1, the black part is the main phase 2 and the white or gray parts were the crystalline phases.

On the basis of the analysis results, the average grain size of the crystalline phases 3 on an arbitrary area having a size of 100 μm×100 μm in a cross-section of the alumina sintered body 1 was measured (see FIG. 1). Each grain size of the crystalline phases 3 were calculated on the basis of each equivalent circle diameter of the crystalline phases 3 from the EPA analysis results. That is, the diameter of the circle having the same area as the area of each crystalline phase 3 was defined as the grain size of the crystalline phase 3, and the arithmetic average of the grain sizes of the crystalline phases 3 was calculated thereby obtaining the average grain size. Table 1 shows the average grain size of the crystalline phases 3 on an arbitrary area of 100 μm×100 μm of a cross-section of each specimen, below.

The number of the crystalline phases 3 having grain size of 1 μm to 5 μm in the arbitrary area having a size of 100 μm×100 μm was counted. The number of the crystalline phases 3 having the predetermined grain size can also be measured using the EPMA. That is, the number of the crystalline phases 3 having a predetermined grain size on an arbitrary area having a size of 100 μm×100 μm in a cross-section of each specimen was counted. The result was shown in Table 1 below.

Figure 2:
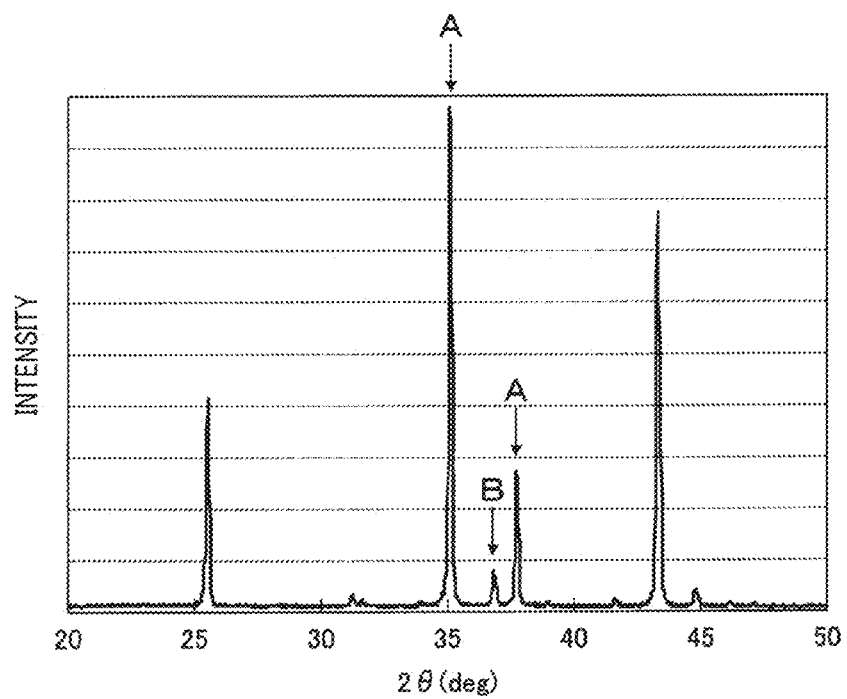
FIG. 2 is a chart showing the X-ray diffraction pattern of the alumina sintered body in Example 1.

The crystal structure of crystalline phase of each specimen was examined using an X-ray diffractometer (RINT2100 manufactured by Rigaku). Specifically, the measurement was performed under the condition of measurement range of 20.0° to 60.0°, scanning width of 0.02°, accelerating voltage of 40 kV and electrical current of 20 mA. FIG. 2 shows the result of Specimen 6 as an example of the XRD patterns. In FIG. 2, in addition to peaks originated from alumina and indicated with the arrows A, a peak originated from spinel ($MgAl_2O_4$) indicated with the arrow B was observed. Although illustration is omitted, crystalline phases of cordierite, forsterite and steatite can also be examined by XRD analysis. The structure of the crystalline phase of each specimen is shown in Table 1.

Next, using a withstand voltage measurement system, the withstand voltage of the alumina sintered body of each specimen was measured. Specifically, an internal electrode of the withstand voltage measurement system was inserted into the alumina composite sintered body (alumina sintered body) having the insulator shape. An external electrode having a circular ring shape was fitted around the outer periphery of the alumina sintered body, and arranged such that the distances between the internal and external electrodes at the measurement points were always within a range of 1.0 mm (which was the thickness of the alumina sintered body)±0.05 mm. Thereafter, a high voltage from a constant-voltage source, which was generated by an oscillator and a coil, was applied between the internal electrode and the external electrode. At this time, the voltage was increased by 1 kV/sec at a frequency of 30 cycle/sec, the voltage being monitored by an oscilloscope. The voltage when dielectric breakdown occurred in the alumina sintered body was measured as the withstand voltage. FIG. 1 shows the result. On the basis of the results of Table 1, the relation between the average grain size of the crystalline phase and the withstand voltage was shown in FIG. 3, and the relation between the number of crystalline phases having a grain size of 1 to 5 μm and the withstand voltage was shown in FIG. 4.

TABLE 1

| Specimen No. | Crystalline phase | Average grain size (μm) | Number of crystalline phases having grain size of 1 to 5 μm | Withstand voltage (kV) |
|---|---|---|---|---|
| X1 | Spinel | 0.2 | 554 | 19 |
| X2 | Spinel | 0.3 | 467 | 20 |
| X3 | Spinel | 0.4 | 412 | 31 |
| X4 | Spinel | 0.7 | 356 | 35 |
| X5 | Spinel | 1.4 | 299 | 35 |
| X6 | Spinel | 2.3 | 218 | 34 |
| X7 | Spinel | 3.6 | 112 | 35 |
| X8 | Spinel | 4.7 | 38 | 33 |
| X9 | Spinel | 5.3 | 8 | 33 |
| X10 | Spinel | 6.1 | 5 | 23 |
| X11 | Spinel | 9.5 | 3 | 21 |
| X12 | Cordierite | 0.3 | 433 | 19 |
| X13 | Cordierite | 1.6 | 305 | 33 |
| X14 | Cordierite | 4.1 | 55 | 32 |
| X15 | Cordierite | 6.2 | 6 | 25 |
| X16 | Cordierite | 7.2 | 5 | 20 |
| X17 | Forsterite | 0.3 | 512 | 23 |
| X18 | Forsterite | 2.3 | 244 | 32 |
| X19 | Forsterite | 4.9 | 82 | 31 |
| X20 | Forsterite | 6.3 | 15 | 24 |
| X21 | Steatite | 0.2 | 578 | 25 |
| X22 | Steatite | 0.3 | 401 | 26 |
| X23 | Steatite | 1.4 | 243 | 31 |
| X24 | Steatite | 5.2 | 17 | 30 |
| X25 | Steatite | 7.1 | 7 | 20 |

Figure 3:
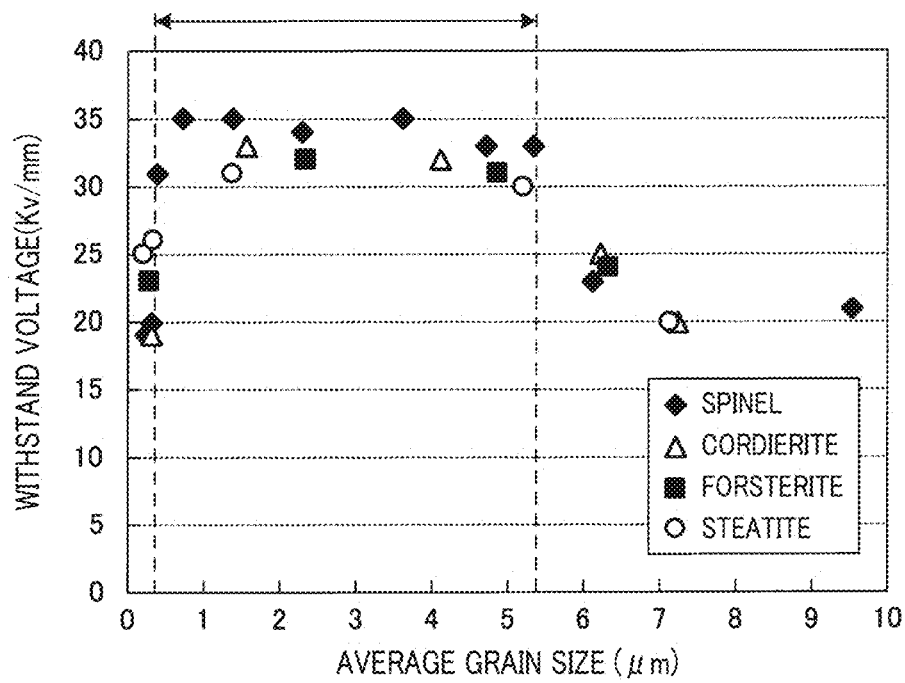
FIG. 3 is a chart showing a relation between average grain size of the crystalline phases and withstand voltage for the sample in Example 1.
Figure 4:
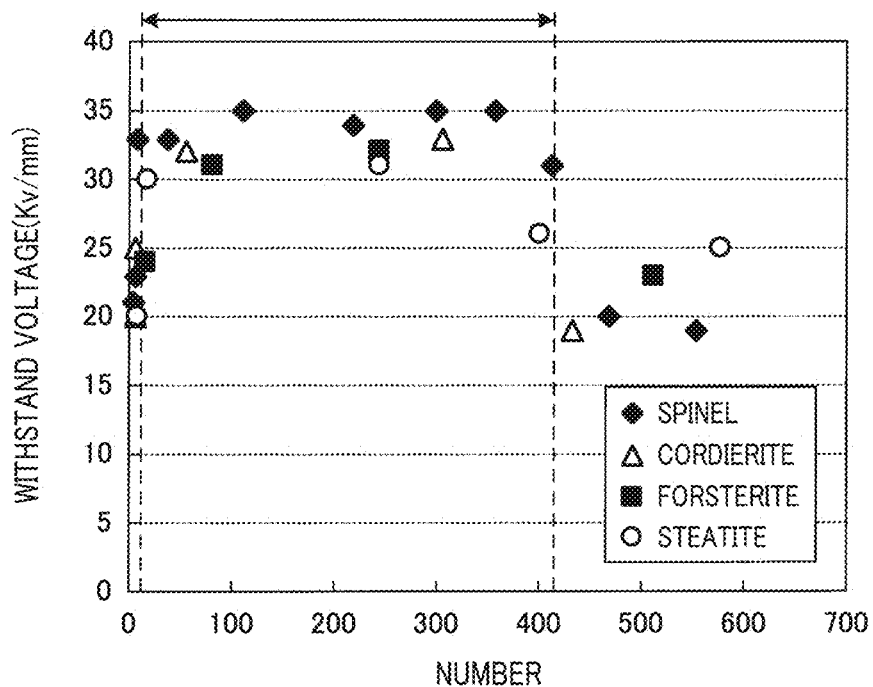
FIG. 4 is a chart showing a relation between the number of crystalline phases having grain sizes of 1 to 5 μm and withstand voltage for the sample in Example 1.

As can be seen from Table 1, Specimens X1 to X11 were the alumina sintered bodies containing the crystalline phases consisting of spinel. Specimens X12 to X16 were the alumina sintered bodies containing the crystalline phases consisting of cordierite. Specimens X17 to X20 were the sintered bodies containing the crystalline phases consisting of forsterite. Specimens X21 to X25 were the sintered bodies containing the crystalline phases consisting of steatite. Of these, the alumina sintered bodies (Specimens X3 to X9, X13, X14, X18, X19, X23 and X24) showed high withstand voltage of 30 kV or more (see Table 1, FIGS. 3 and 4), the average grain sizes of the crystalline phases on arbitrary areas having a size of 100 μm×100 μm in the cross-sections of the alumina sintered bodies being 0.4 μm to 5.3 μm, the number of the crystalline phases having grain sizes of 1 to 5 μm in the areas being 8 to 412. It will be noted that FIG. 3 shows, with the arrow, the range where the average grain size is 0.4 μm to 5.3 μm, and that FIG. 4 shows, with the arrow, the range where the number of the crystalline phases having grain sizes of 1 to 5 μm is 8 to 412. Compared to this, regarding the alumina sintered bodies (Specimens X1, X2, X10 to X12, X15 to X17, X20 to X22 and X25) which are small or large in average grain size of the crystalline phases or in the number of the crystalline phases having the predetermined grain size, the withstand voltages were low (see Table 1, FIGS. 3 and 4). It will be noted that the area where the average grain size is 0.4 μm to 5.3 μm is indicated with an arrow in FIG. 3, and that the area where the number of the crystalline phases having grain sizes of 1 μm to 5 μm is 8 to 412 is indicated with an arrow in FIG. 4. It will be noted that the number of the crystalline phases is not the number of types of the crystalline phases, but the number of the crystalline domains dispersed in the main phase.

On the other hand, the alumina sintered bodies (Specimen X1, X2, X10 to X12, X15 to X17, X20 to X22 and X25) where the average grain size of the crystalline phases was too small or too large or where the number of the crystalline phases having the predetermined grain size was too small or too large showed low withstand voltage (see Table 1, FIGS. 3 and 4).

As can be seen from Table 1, FIGS. 3 and 4, when the crystalline phase was $MgAl_2O_4$, dielectric strength was improved especially significantly. Accordingly, it is preferred that the crystalline phases of the alumina sintered body consist of at least $MgAl_2O_4$.

In preparing the alumina sintered body of this example, as the raw materials, activated alumina is used in addition to α-alumina, as described above. Further, the mixing procedure is divided into at least two steps, and at least two of additives consisting of $SiO_2$, MgO and γ-$Al_2O_3$ are preliminarily mixed together before the main ceramic material is mixed in. This can increase reactivity between the additives. As a result, by regulating the formulation ratio of the raw materials as in this example, the average grain size of the crystalline phases can be within a predetermined range, and the number of the crystalline phases having a grain size of 1 μm to 5 μm can be within a predetermined range. As a result, an alumina sintered body having high dielectric strength can be produced.

Figure 5:
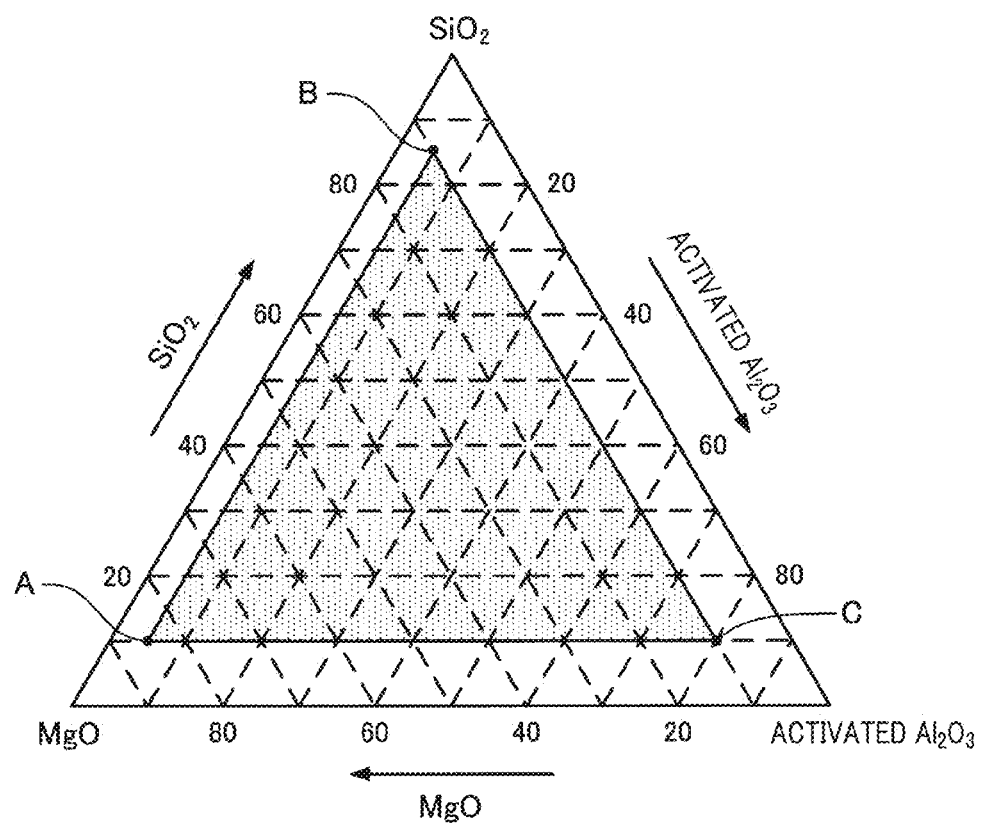
FIG. 5 is a triangle chart showing preferable formulation ratios of the additive constituents in Example 1.

In preparing Specimens X3 to X9, X13, X14, X18, X19, X23 and X24, the formulation ratio of each additive component ($SiO_2$, MgO and γ-$Al_2O_3$) was regulated within the range (shaded area with dot) shown in FIG. 5. That is, when the composition ratio of each additive component is $SiO_2$:MgO:γ-$Al_2O_3$=a:b:c (a+b+c=100 mass %), the formulation (point (a, b, c)) of the additive compositions is regulated to be within a range surrounded by three points, A (10, 85, 5), B (85, 10, 5) and C (10, 10, 80). Formulation of the additive composition within the above-described range can regulate the average grain size of the crystalline phases and the number of the crystalline phases having a predetermined grain size to be within the aforementioned desired range. That is, in the alumina sintered body, the crystalline phases having the specified grain size are dispersed at the specified ratio. As a result, there is little variation of dielectric strength in the alumina sintered body, and the alumina sintered body having high dielectric strength can be produced as described above.

On the other hand, outside the range surrounded by the three points, in the area where MgO content is large and γ-$Al_2O_3$ content is small or in the area where MgO content is small and $SiO_2$ is large, a glass phase is generated. That is, the crystalline phase consisting of at least one compound selected from the group consisting of $MgAl_2O_4$, $2MgO.2Al_2O_3.5SiO_2$, $2MgO.SiO_2$ and $MgO.SiO_2$ cannot be generated sufficiently. In the area where $SiO_2$ content is small and γ-$Al_2O_3$ content is large outside the range surrounded by the three points, sintering cannot be advanced enough, which prevents generation of the desired composite oxide.

Example 2

In this example, alumina sintered bodies having the same composition as Specimens X4 to X6 in Example 1 were prepared by a method different from Example 1, and the average grain size of the crystalline phases, the number of the crystalline phases and withstand voltage were examined. In this example, hereinafter are described three types of alumina sintered bodies (Specimens X26 to X28) prepared with the same composition as Specimen 4, three types of alumina sintered bodies (Specimens X29 to X31) prepared with the same composition as Specimen 5, and three types of alumina sintered bodies (Specimens X32 to X34) prepared with the same composition as Specimen 6.

Specimens X26, X29 and X32 were the alumina sintered bodies prepared in a similar manner to Example 1 except for using no activated alumina. Specimens X26, X29 and X32 were prepared by increasing the amount of α-alumina in place of activated alumina, mixing the raw material at the same composition as Specimens X4, X5 and X6 in a similar manner to Example 1, and using a similar method as Example 1 in other points.

Specimens X27, X30 and X33 were alumina sintered bodies prepared in a similar manner to Example 1 except for not mixing the main ceramic material and the additives separately but adding the main ceramic material and the additive into a mixing tank simultaneously.

Specimens X28, X31 and X34 were alumina sintered bodies prepared in a similar manner to Example 1 except for using no activated alumina and adding the main ceramic material and the additive into a mixing tank simultaneously.

Regarding these Specimens X26 to X34, also, the average grain size of the crystalline phases, the number of the crystalline phases having grain sizes of 1 to 5 μm, and the withstand voltage were examined in a similar method to Example 1. Table 2 shows the results. In Table 2, undetectable means an amorphous glass phase was formed. In Table 2, the results of Specimens X4 to X6 prepared in Example 1 are shown together for comparison.

and the number of the crystalline phases having grain sizes of 1 μm to 5 μm are 8 to 412 can be produced (see Specimens X4, X5 and X6 of Table 2, and Table 1 of Example 1). On the other hand, when activated alumina is not used, or when the main ceramic material and the additive are mixed simultaneously, it is difficult to regulate the average grain size and the number of the crystalline phases having a specified grain size to be within the above range (Specimens X26 to X34). As a result, an alumina sintered body having excellent dielectric strength cannot be obtained.

Example 3

Figure 6:
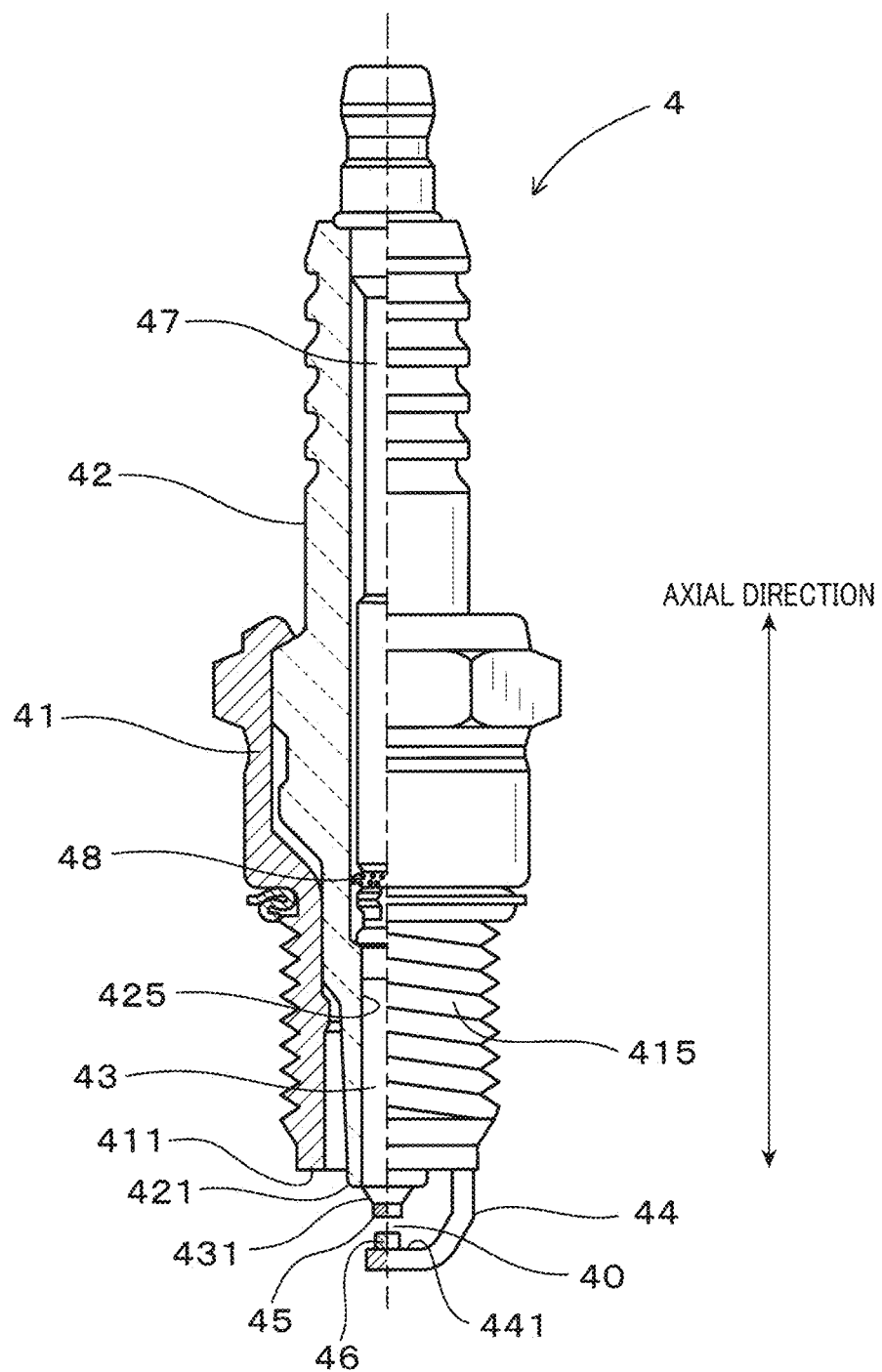
FIG. 6 is a partially cross-sectional view showing the spark plug in Example 3.

This example is an example of a spark plug having the insulator consisting of the alumina sintered body of Example 1. As shown in FIG. 6, the spark plug 4 is used as an ignitor of engines for vehicles. The spark plug 4 is inserted into and fixed to a tapped hole provided in an engine head (not shown). The engine head forms a combustion chamber of the engine. The spark plug 4 has a cylindrical mounting fitting 41 made of an electrically conductive material such as iron or steel and may include low carbon-steel or the like. A mounting screw portion 415 for fitting the spark plug 4 to an engine block (not shown) is provided on an outer periphery surface of the mounting fitting 41. In this example, the nominal diameter of the mounting screw portion 415 is 10 mm or less, and the mounting screw portion 415 is a screw of size M10 defined in JIS (Japan Industrial Standard) or less.

The insulator 42 is disposed inside the mounting fitting 41 and fixed. The insulator 42 is made of the alumina sintered body of Specimen X5 of Example 1. A tip 421 of an axial direction of the insulator 42 is projected from a tip 411 of the axial direction of the mounting fitting 41. A center electrode

TABLE 2

| Specimen No. | Divided mixing step of main ceramic material and additive | Use of activated alumina | Crystalline phase | Average grain size (μm) | Number of crystalline phases of grain size of 1 to 5 μm | Withstand voltage (kV) |
|---|---|---|---|---|---|---|
| X4 | Yes | Yes | Spinel | 0.7 | 356 | 35 |
| X26 | Yes | No | Amorphous (Glass) | Undetectable | 0 | 21 |
| X27 | No | Yes | Amorphous (Glass) | Undetectable | 0 | 22 |
| X28 | No | No | Amorphous (Glass) | Undetectable | 0 | 18 |
| X5 | Yes | Yes | Spinel | 1.4 | 299 | 35 |
| X29 | Yes | No | Spinel | 0.3 | 15 | 25 |
| X30 | No | Yes | Amorphous (Glass) | Undetectable | 0 | 24 |
| X31 | No | No | Amorphous (Glass) | Undetectable | 0 | 20 |
| X6 | Yes | Yes | Spinel | 2.3 | 218 | 34 |
| X32 | Yes | No | Spinel | 0.3 | 11 | 27 |
| X33 | No | Yes | Spinel | 0.3 | 13 | 27 |
| X34 | No | No | Amorphous (Glass) | Undetectable | 0 | 22 |

As can be seen from Table 2 and Table 1 of Example 1, the average grain size of the crystalline phases and the number of the crystalline phases having grain sizes of 1 μm to 5 μm can be regulated within the predetermined range by using activated alumina, mixing at least two selected from $SiO_2$, MgO and $\gamma\text{-}Al_2O_3$ dispersed in a liquid such as water, and thereafter mixing in the rest of the raw materials such as α-alumina. That is, in this case, the alumina sintered body where the average grain size of the crystalline phases is 0.4 μm to 5.3 μm

43 is fixed to an axial hole 425 of the insulator 42, and the center electrode 43 is held by and insulated from the mounting fitting 41. The center electrode 43 is, for example, a columnar body having an inner portion and an outer portion, the inner portion being made of a metal material having excellent thermal conductivity such as copper, the outer portion being made of a metal material having excellent heat-resistance and corrosion-resistance such as a nickel-based alloy.

As shown in FIG. 6, the center electrode 43 is provided such that a tip 431 of the axial direction projects from the tip 421 of the insulator 42. Thus, the center electrode 43 is disposed inside the mounting fitting 41 in a state where the tip 431 is projected from the mounting fitting 41.

On the other hand, a ground electrode 44 has a columnar shape made of nickel-based alloy containing nickel as a main constituent. The ground electrode 44 of this example has a polygonal pillar shape, and one axial end thereof is fixed to the tip 411 of the mounting fitting 41, for example, by welding. A middle portion of the axial direction of the ground electrode 44 is bent into an L-shape. A side surface 441 of the other axial end of the ground electrode 44 faces the tip 431 of the center electrode 43 through a spark discharge gap 40.

A noble metal tip 45 is provided to project from the tip 431 of the center electrode 43. A noble metal tip 46 is provided on the side surface 441 of the ground electrode 44 to project from the side surface 441. The noble metal tip 45 and 46 is made of Ir (iridium) alloy, Pt (platinum) alloy or the like, and bonded to a base metal of the electrodes 43 and 44 by laser welding, resistance welding or the like.

The spark discharge gap 40 is a gap between tip surfaces of the noble metal tips 45 and 46. The size of the spark discharge gap 40 may be, for example, about 1 mm.

A stem 47 for removing the center electrode 43 is provided at a portion opposite to the tip 421 of the insulator 42 in the axial hole 425 of the insulator 42. The stem 47 is a bar, has electrical conductivity, and electrically connected to the center electrode 43 through an electrically conductive glass seal 48 inside the axial hole 425 of the insulator 42.

The spark plug 1 has the insulator 42 made of the alumina sintered body of Specimen X5 of Example 1. Accordingly, the insulator 42 shows high dielectric strength. This can reduce the thickness of the insulator of the spark plug, which enables downsizing of the spark plug 1 and application of high voltage to the spark plug 1. Although this example uses the alumina sintered body of Specimen X5 of Example 1, there can also be used the alumina sintered bodies of Specimens X3, X4, X6 to X9, X13, X14, X18, X19, X23 and X24 which showed high dielectric strength in Example 1. That is, the same effect as this example can be obtained by using the insulator made of the alumina sintered body where the average grain size of the crystalline phases on an arbitrary area having a size of 100 μm×100 μm in a cross-section is 0.4 μm to 5.3 μm, and the number of the crystalline phases having grain sizes of 1 to 5 μm is 8 to 412.

Though the invention has been described with respect to the specific preferred examples, many variations and modifications will become apparent to those skilled in the art upon reading the present application. It is therefore the intention that the claims be interpreted as broadly as possible in view of the prior art to include all such variations and modifications.

What is claimed is:

1. An alumina sintered body, comprising:
   a main phase consisting of alumina crystal; and
   crystalline phases dispersed in the main phase,
   wherein
   the crystalline phases consist of at least one selected from a group consisting of $MgAl_2O_4$, $2MgO.2Al_2O_3.5SiO_2$, $2MgO.SiO_2$ and $MgO.SiO_2$,
   the average grain size of the crystalline phases is 0.4 μm to 5.3 μm on an arbitrary area having a size of 100 μm×100 μm in a cross-section of the alumina sintered body, and
   the number of the crystalline phases having grain sizes of 1 μm to 5 μm is 8 to 412 on the area.

2. The alumina sintered body according to claim 1, wherein at least one of the crystalline phases consists of $MgAl_2O_4$.

3. A spark plug comprising an insulator made of the alumina sintered body according to claim 1.

* * * * *